United States Patent
Loke

(10) Patent No.: US 7,088,973 B2
(45) Date of Patent: Aug. 8, 2006

(54) WIRELESS COMMUNICATIONS DEVICE ALLOWING A SOFT HANDOFF PROCEDURE IN A MOBILE COMMUNICATIONS SYSTEM

(75) Inventor: Aravind Loke, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 271 days.

(21) Appl. No.: 10/829,784

(22) Filed: Apr. 22, 2004

(65) Prior Publication Data

US 2004/0198275 A1    Oct. 7, 2004

Related U.S. Application Data

(63) Continuation of application No. 09/342,165, filed on Jun. 28, 1999, now Pat. No. 6,728,528.

(51) Int. Cl.
*H04B 1/00* (2006.01)

(52) U.S. Cl. .................. 455/130; 455/141; 455/318; 455/323; 455/442; 331/2

(58) Field of Classification Search ............. 455/313, 455/318, 323, 130, 131, 436–439, 442; 331/1 R, 331/2, 23; 370/335, 342, 331; 375/340, 375/343, 35

See application file for complete search history.

(56) References Cited

U.S. PATENT DOCUMENTS 5,469,115 A    11/1995    Peterzell et al.

(Continued)

FOREIGN PATENT DOCUMENTS

EP    0 886 373 A1    12/1998
FR    2 767 992    3/1999

OTHER PUBLICATIONS

RI 23107U Personal Communication Services (PCS) Power Amplifier (1850-1910 MHz) Data Sheet, Rockwell Semiconductor Systems, pp. 1-9, Aug. 25, 1998.

(Continued)

*Primary Examiner*—CongVan Tran
(74) *Attorney, Agent, or Firm*—Knobbe Martens Olson & Bear LLP

(57) ABSTRACT

A wireless communications device includes an antenna that receives a first signal at a first frequency and a second signal at a second frequency and converts the first and second signals into a composite signal. A first oscillator outputs a first oscillator signal at a first frequency and a second oscillator outputs a second oscillator signal at a second frequency. A demodulator receives the composite signal and the first and second oscillator signals. The oscillator signals are selected so that the demodulator generates a low frequency signal with components of the first and second signals occupying a common frequency band. The wireless communications device allows executing a "Soft Handoff" even when the first and second frequencies are different.

43 Claims, 8 Drawing Sheets

U.S. PATENT DOCUMENTS

| | | |
|---|---|---|
| 5,722,053 A | 2/1998 | Kornfeld et al. |
| 5,745,846 A | 4/1998 | Myer et al. |
| 5,809,088 A * | 9/1998 | Han ............................ 375/344 |
| 5,825,833 A * | 10/1998 | Sakaue ....................... 375/344 |
| 5,896,562 A | 4/1999 | Heinonen |
| 5,926,503 A | 7/1999 | Kelton et al. |
| 6,069,925 A | 5/2000 | Koh |
| 6,115,473 A * | 9/2000 | Takagi ........................... 381/2 |
| 6,163,566 A | 12/2000 | Shiino |
| 6,249,559 B1 * | 6/2001 | Jun ............................. 375/376 |
| 6,363,126 B1 * | 3/2002 | Furukawa et al. .......... 375/344 |

OTHER PUBLICATIONS

TIA/EIA Engineering Standards Proposal No. 3815, published by telecommunications™ Industry Association, Dec. 3, 1997.

* cited by examiner

WIRELESS COMMUNICATIONS DEVICE ALLOWING A SOFT HANDOFF PROCEDURE IN A MOBILE COMMUNICATIONS SYSTEM

This application is a continuation of U.S. application Ser. No. 09/342,165, filed on Jun. 28, 1999, now U.S. Pat. No. 6,728,528, the entirety of which is hereby incorporated herein by reference.

BACKGROUND OF THE INVENTION

1. Field of the Invention

The invention generally relates to a communications system. More particularly, the invention relates to a wireless communications device and a method of receiving radio frequency signals within a communications system.

2. Description of the Related Art

One example of a communications system is a wireless communications system which can be a cellular mobile communications system. The cellular mobile communications system is implemented in a geographical area and logically divided into individual service cells. A fixed transceiver station such as a base station defines at least one cell and is connected to a base station controller. Mobile stations, such as hand-held or car-based cellular phones, move freely within the geographical area covered by a cell. The mobile stations not only move within a single cell, but also from one cell to a neighboring cell.

The base station handles all telephone traffic to and from those cellular phones which are currently located in the cell. The base station that serves a cellular phone is typically the one which is closest to the cellular phones and, thus, provides in many cases the best radio communications path to the cellular phones.

The cellular phones and the serving base station exchange radio signals in accordance with a communications protocol defined for a given communications system. The radio signals have frequencies within frequency bands that are assigned to the cells. In one example of a communications protocol, the radio signals can be structured in frames and channels.

In conventional Code Division Multiple Access (CDMA) systems, a pilot channel is defined for communications between the base stations and the cellular phones. The pilot channel carries no information, but provides the cellular phone, for example, with a reference for time, phase, and signal strength. The cellular phone constantly evaluates the strengths of the pilot channels of the serving and neighboring base stations to determine potential base stations. When the strength of the pilot channel of the serving base station falls below a predetermined threshold and the strength of the pilot channel of the neighboring base station exceeds a predetermined threshold, a handoff procedure is initiated. The procedure that transfers the mobile station from one cell to another cell, without dropping a call or losing information, is often called "Soft Handoff."

In many conventional Soft Handoff procedures, the base stations of neighboring cells use the same frequencies. This requirement, however, limits the number of mobile stations that can be served by one base station. For example, if two neighboring base stations operate at different frequencies, a so-called "Hard Handoff" procedure typically takes place which causes a break in an existing connection and may result in a loss of information.

SUMMARY OF THE INVENTION

An aspect of the invention involves a wireless communications device for a communications system. The wireless communications includes an antenna, which receives a first signal at a first radio frequency and a second signal at a second radio frequency, and convert the first and second signals into a composite radio frequency (RF) signal. A first oscillator is operable to output a first oscillator signal at a first frequency, and a second oscillator is operable to output a second oscillator signal at a second frequency. A demodulator is coupled to receive the composite RF signal and the first and second oscillator signals. The oscillator signals are selected so that the demodulator generates a low frequency signal with components of the first and second signals occupying a common frequency band.

Another aspect of the invention involves a wireless communications device having a first input configured to receive an input signal which comprises a first component allocated within a first frequency band and a second component allocated within a second frequency band. A first oscillator is configured to generate a first oscillator signal at a first oscillator frequency, and a second oscillator is configured to generate a second oscillator signal at a second oscillator frequency. A mixer is configured to receive the input signal, the first oscillator signal, and the second oscillator signal, and to convert at least a portion of the first component and at least a portion of the second component to a third frequency band.

A further aspect of the invention involves a device having at least a first terminal which is configured to receive a first signal within a first frequency band from a first source and a second signal within a second frequency band from a second source. At least a second terminal is configured to receive at least a first reference signal and a second reference signal. A modulator in communication with the first and second terminals is configured to generate a first difference component within a third frequency band. The first difference component comprises the difference between a portion of the first signal within the first frequency band and the first reference signal. The modulator is further configured to generate a second difference component within the third frequency band, the second difference component comprising the difference between a portion of the second signal within the second frequency band and the second reference signal.

Another aspect of the invention involves a wireless communications device having a first input to receive an input signal which comprises a first component having a first frequency allocated within a first frequency band and a second component having a second frequency allocated within a second frequency band. A first oscillator is configured to generate a first oscillator signal at a first oscillator frequency, and a second oscillator is configured to generate a second oscillator signal at a second oscillator frequency. A mixer is configured to receive the input signal, the first oscillator signal, and the second oscillator signal, and to convert at least a portion of the first component and at least a portion of the second component into a third frequency band. The portion of the first component has a first difference frequency corresponding to a difference between the first frequency and the first oscillator frequency, and the portion of the second component has a second difference frequency corresponding to a difference between the second frequency and the second oscillator frequency. The first difference frequency is approximately equal to the second difference frequency, both located within the third frequency band.

A further aspect of the invention involves a method of receiving radio frequency (RF) signals with a wireless communications device that is operable in a communications system. The device receives a first signal within a first frequency band from a first source, and a second signal within a second frequency band from a second source. Further, the device transforms the first and second signal into a third frequency band, and processes the frequency-transformed first and second signals in order to maintain communications with the first and second sources.

Another aspect of the invention involves a method of receiving radio frequency (RF) signals. A first RF signal has a first radio frequency and originates from a first transmitter station, and a second RF signal has a second radio frequency and originates from a second transmitter station. The first and second RF signals are received and converted into a composite signal. A first oscillator signal is generated having a first oscillator frequency, which is selected to have a first frequency difference to the first radio frequency. A second oscillator signal is generated having a second oscillator frequency, which is selected to have a second frequency difference to the first radio frequency. The composite signal is mixed with the first and second oscillator signals to generate an intermediate frequency signal. The intermediate frequency signal comprises a component of the first RF signal and a component of the second RF signal with the components being located within a common frequency band. The intermediate frequency signal is processed to generate a first baseband signal and a second baseband signal. The first baseband signal corresponds to the first RF signal and the second baseband signal corresponds to the second RF signal.

For purposes of summarizing the invention, certain aspects, advantages and novel features of the invention have been described herein. Of course, it is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

These and other aspects, advantages, and novel features of the invention will become apparent upon reading the following detailed description and upon reference to the accompanying drawings.

DETAILED DESCRIPTION OF THE PREFERRED EMBODIMENT

Figure 1:
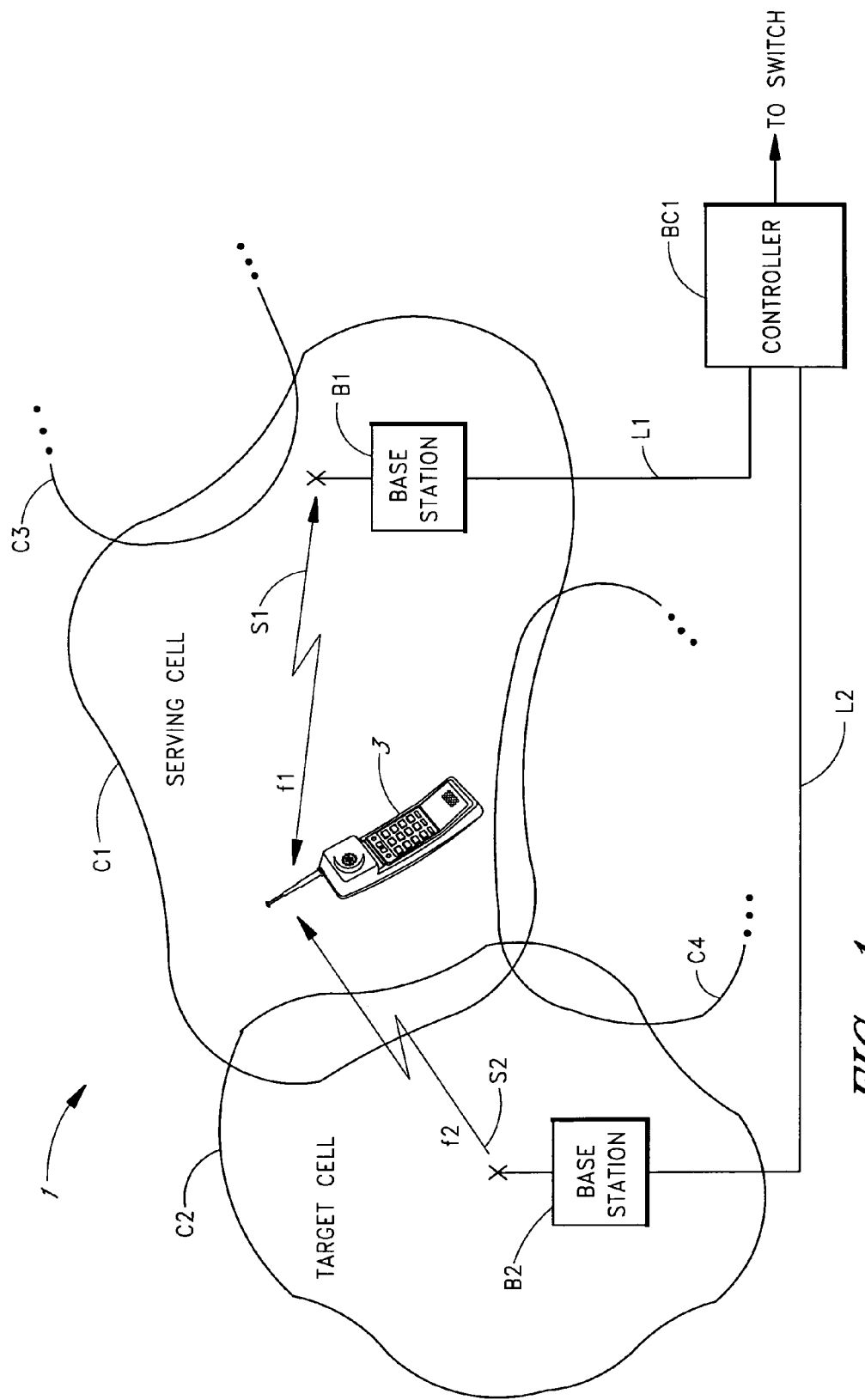
FIG. 1 shows an exemplary infrastructure of a mobile communications system.

FIG. 1 shows an illustration of a mobile communications system 1 manufactured by a public or private telephone company ("service provider"). The telephone company can provide access to a public switched telephone network (PSTN). The operating telephone company determines parameters of the mobile communications system 1 including, but not limited to, geographical coverage area, communications standards, frequency, system capacity, and the like.

In one embodiment, the mobile communications systems 1 is a cellular mobile communications system configured to operate as a Code Division Multiple Access (CDMA) system. Such an exemplary mobile communications system 1 is referred to as a cellular system. An embodiment of the present invention is hereinafter described with reference to, but not limited to, such a cellular system 1. It is contemplated that the present invention is applicable in other mobile communications systems, such as systems known as a personal communications service using CDMA technology (PCS/CDMA).

The cellular system 1 of FIG. 1 includes a plurality of base stations B1, B2, each defining a cell. For instance, the base station B1 defines a cell C1 and the base station B2 defines a cell C2. Neighboring cells C3, C4 are shown for illustrative purposes. As indicated, the cells C1–C4 overlap to a certain degree in the illustrated embodiment. It is contemplated that in other embodiments, the cells C1–C4 can more or less overlap depending on the geographical area.

Communication lines L1, L2 connect the base stations B1, B2 to a base station controller BC1, which controls the base stations B1, B2 and connects the cellular system 1 to a switching center in the domain of the service provider or to a (wire-based) public telephone system (PSTN). In FIG. 1, this connection is illustrated as "TO SWITCH." The communications lines L1, L2 are, for example, fiber-optic cables, twisted pair lines, coaxial cables, or combinations thereof typically used for communications lines. In certain embodiments, the communications lines L1, L2 can represent wireless bi-directional radio connections and the like.

The cellular system 1 further includes at least one mobile station 3 which can freely move within the cellular system 1. It is contemplated that a plurality of mobile stations 3 can be active or inactive within the cellular system 1. The mobile station 3 can be, for example, a wireless phone, a handheld cellular phone, a cellular phone mounted in a vehicle, or any other wireless device (e.g., a pager) which can be used in a cellular system 1. The mobile station 3 can move freely within each cell C1–C4 and between the cells C1–C4. In FIG. 1, the mobile station 3 is indicated as a handheld cellular phone, which is located within the cell C1 and served by the base station B1. The mobile station 3 is hereinafter referred to as the phone 3.

As shown, the phone 3 is currently located within the cell C1 and has a bi-directional radio connection with the base station B1. The bi-directional radio connection indicates that calls to and from the phone 3 are handled by the base station B1. The base station B1 is therefore referred to as the serving base station B1. In one embodiment, the radio connection is established through a signal S1 having a frequency band around a carrier frequency f1. In one embodiment, the carrier frequency f1 is approximately 880 MHz.

When the phone 3 moves within the cellular system 1, the phone 3 is handed off from one cell to another. This is referred to as an intra-system handoff. Before the handoff, the phone 3 communicates with the serving base station B1 at a "pre-handoff" frequency f1, and after the handoff, the phone 3 communicates with the new base station B1 at a "post-handoff" frequency f2 of a signal S2. Depending on the infrastructure of the cellular system 1, the post-handoff frequency f2 can be the same as the pre-handoff frequency f1, or the post-handoff frequency f2 can be different from the pre-handoff frequency f2.

Figure 2:
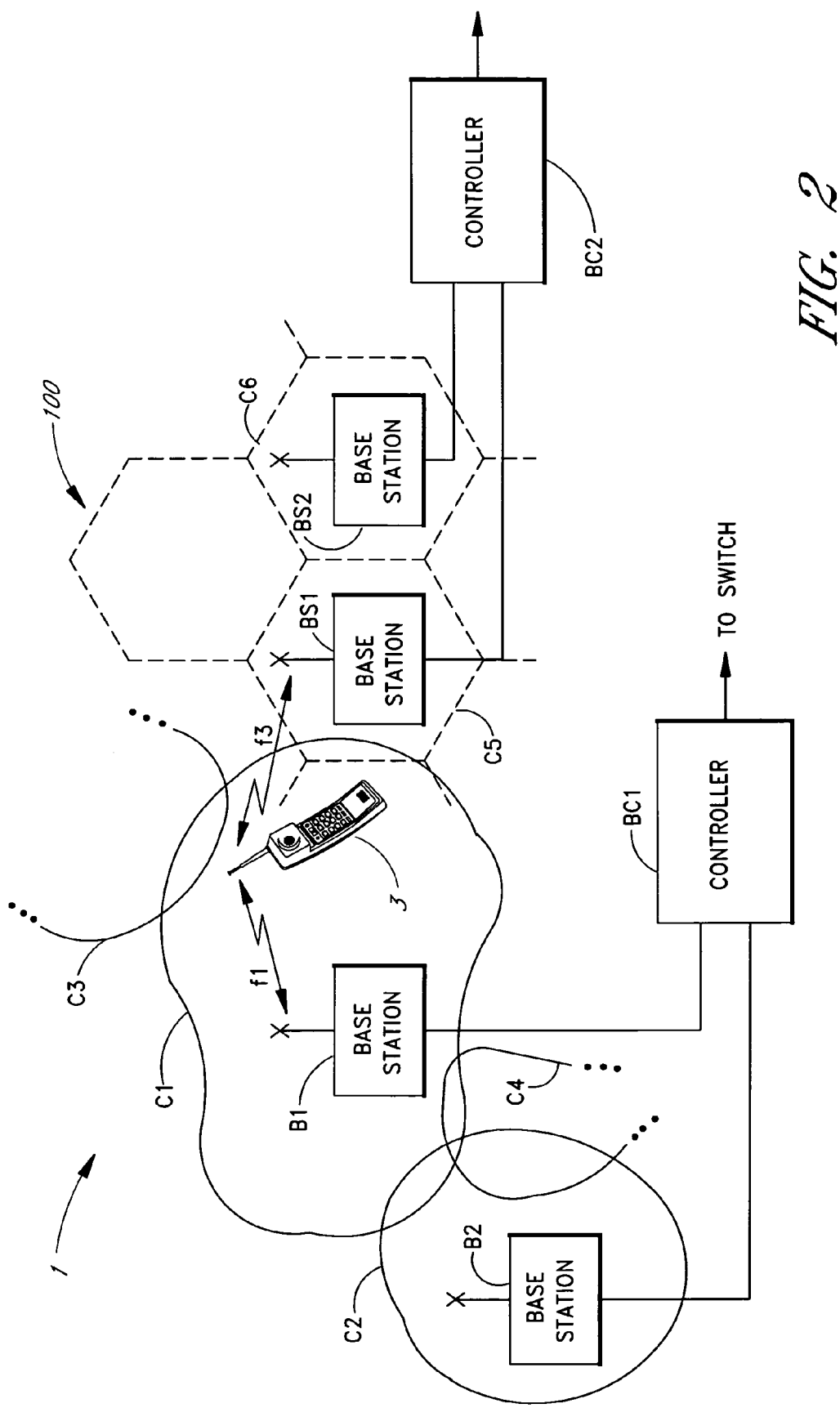
FIG. 2 shows infrastructures of two separated mobile communications systems.

FIG. 2 illustrates a scenario in which the geographical area covered by the cellular system 1 is also covered by a second mobile communications system 100. The second mobile communications system 100 is under the control of a different service provider whose infrastructure is in one embodiment generally similar to the infrastructure of the cellular system 1. In FIG. 2, the infrastructure of the cellular system 1 is as shown in FIG. 1 and the phone 3 is in communication with the serving base station B1.

An exemplary cell structure of the second mobile communications system 100 is indicated through dashed lines. The second mobile communications system 100 has a plurality of base stations BS1, BS2, which are connected to a controller BC2. The base station BS1 serves a cell C5 and the base station BS2 serves a cell C6. The second mobile communications system 100 has assigned frequencies (e.g., f3) for the cells that can be different from the frequencies assigned to the cellular system 1. For example, the second mobile communications system 100 can be a PCS/CDMA system operating at a frequency band around approximately 1800 MHz and the cellular system 1 can be a cellular CDMA system operating at a frequency band between approximately 800 MHz and approximately 900 MHz.

In addition to the intra-system handoff described with reference to FIG. 1, in some applications, the phone 3 can be configured to move (roam) freely between the cellular system 1 and the mobile communications system 100 (e.g., a PCS/CDMA system) as indicated in FIG. 2. That is, the phone 3 has the capability of seamless roaming, for example, from a cellular CDMA system to a PCS/CDMA system. This is referred to as an "inter-system handoff." Under these circumstances, the phone 3 is handed off from the cellular CDMA system to the PCS/CDMA system and the pre-handoff frequency f1 and the post-handoff frequency f3 are different.

Referring to FIGS. 1 and 2, independent if an intra-system handoff or an inter-system handoff occurs, the capability of the desired "Soft Handoff" is maintained within the systems 1, 100. As described below in greater detail, the phone 3 includes two local oscillators which can be tuned to appropriate frequencies so that a radio connection with the base station of a "target" cell can be made before the radio connection with the (previous) serving base station is broken. The first local oscillator is tuned to a frequency $f_{LO1}$, and the second local oscillator can be tuned to a frequency $f_{LO2}$.

The frequencies $f_{LO1}$, $f_{LO2}$ are selected so that the frequencies f1, f2 of the signals S1, S2 are down converted to frequencies within a common frequency band. If the frequencies f1, f2 are approximately the same, the frequencies $f_{LO1}$, $f_{LO2}$ are also approximately the same. Correspondingly, if the frequencies f1, f2 are different, the frequencies $f_{LO1}$, $f_{LO2}$ are different. The latter case occurs, for example, when the signal S1 originates from a cellular CDMA system (f1=880 MHz) and the signal S2 originates from a PCS system (f2=1960 MHz). In this example, the frequency $f_{LO1}$ can be approximately 680 MHz and the frequency $f_{LO2}$ can be approximately 1760 MHz so that after the down conversion resulting differences frequencies (880 MHz–680 MHz, and 1960 MHz–1760 MHz) are within the same frequency band of about 200 MHz.

While the phone 3 is active or in a stand-by mode, the phone 3 constantly evaluates the signal strengths received in the pilot channels of the serving base station B1 and the neighboring base stations, such as the base station B2, to determine potential base stations for an upcoming handoff. When the signal strength of the pilot channel of the serving base station B1 falls below a predetermined threshold and the signal strength of the pilot channel of another base station B2 exceeds a predetermined threshold, the handoff procedure is started. In case the phone 3 is in the stand-by mode, the evaluation of the signal strengths of the pilot channels serves to determine which base station B1, B2, BS1 will be the serving base station if the phone 3 becomes active.

Focusing on an embodiment of a cellular CDMA system which has an infrastructure as shown in FIG. 1, the base station B1 transmits and receives radio signals within a frequency band around the carrier frequency f1 assigned to the cell C1. For instance, the base station B1 transmits at a frequency of approximately 880 MHz and receives at a frequency of approximately 835 MHz. Similarly, the base station B2 transmits at 1960 MHz and receives radio signals within a frequency band around a carrier frequency f2 of approximately 1880 MHz assigned to the cell C2. It is contemplated that in another embodiment, the base stations B1, B2 can operate within the same frequency band, which is assigned to neighboring cells.

Figure 3:
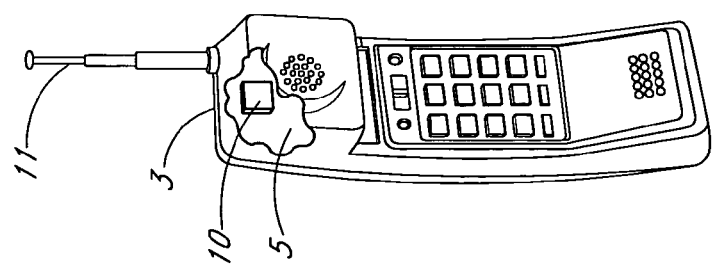
FIG. 3 is an illustration of a cellular phone.

FIG. 3 schematically illustrates one embodiment of the phone 3. The phone 3 includes an antenna 11, a display, and a keypad. A portion of the case of the phone 3 is cut away to show a motherboard 5 of the phone 3 with an integrated circuit 10 which includes an RF receiver, or a portion thereof, as described below. The integrated circuit 10 is hereinafter generally referred to as the RF receiver 10. Although not shown in FIG. 1, those skilled in the art will appreciate that the phone 3 comprises a central processor unit (CPU) and plurality of other components and functional modules of conventional phones.

Figure 4:
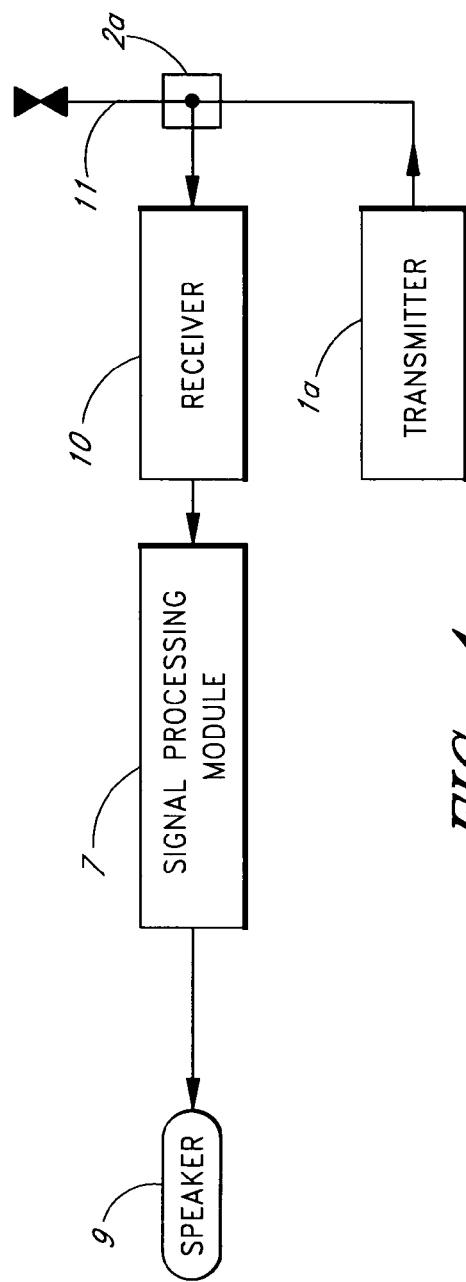
FIG. 4 is an illustration of a receive path of a cellular phone.

FIG. 4 shows a schematic illustration of a receive path and a transmit path. Both paths are associated with the antenna 11 to receive and transmit signals. In the illustrated embodiment, the transmit path includes a conventional transmitter for RF signals, and the receive path comprises the RF receiver 10 (hereinafter referred to as the receiver 10), a signal processing module 7 and a speaker 9. The receiver 10 is interconnected between the antenna 11 and the signal processing module 7 which is connected to the speaker 9., The receiver 10 includes several groups of amplifiers which are separated by frequency-changing circuits (e.g., mixers, modulators or demodulators) to extract information carried by a weak signal voltage that appears at terminals of the antenna 11. The antenna 11 receives the signals S1, S2, for example, from the serving base station B1 of the cell C1 and the target base station B2 of the cell C2, and converts the signals S1, S2 to a composite electrical signal. The composite electrical signal includes the frequencies f1, f2 which can have same or different values depending on the infrastructure of the systems 1, 100. As the frequencies f1, f2 are in the radio frequency range (e.g., 880 MHz, or 1960 MHz), the composite electrical signal is hereinafter referred to as the "composite RF signal."

As described below in greater detail, the receiver 10 converts the composite RF signal, which includes the signals S1, S2, from an initial high frequency (RF) range down to a lower frequency range, the baseband. In one embodiment, the down conversion process includes two stages. A first stage down converts the composite RF signal from the RF range to an intermediate frequency range, and a second stage down converts the composite RF signal from the intermediate frequency range to the baseband. The down conversion process is also known as "heterodyning." Therefore, the receiver 10 outputs the signals S1, S2 as baseband signals, which are input to the signal processing module 7 for further processing.

Figure 5:
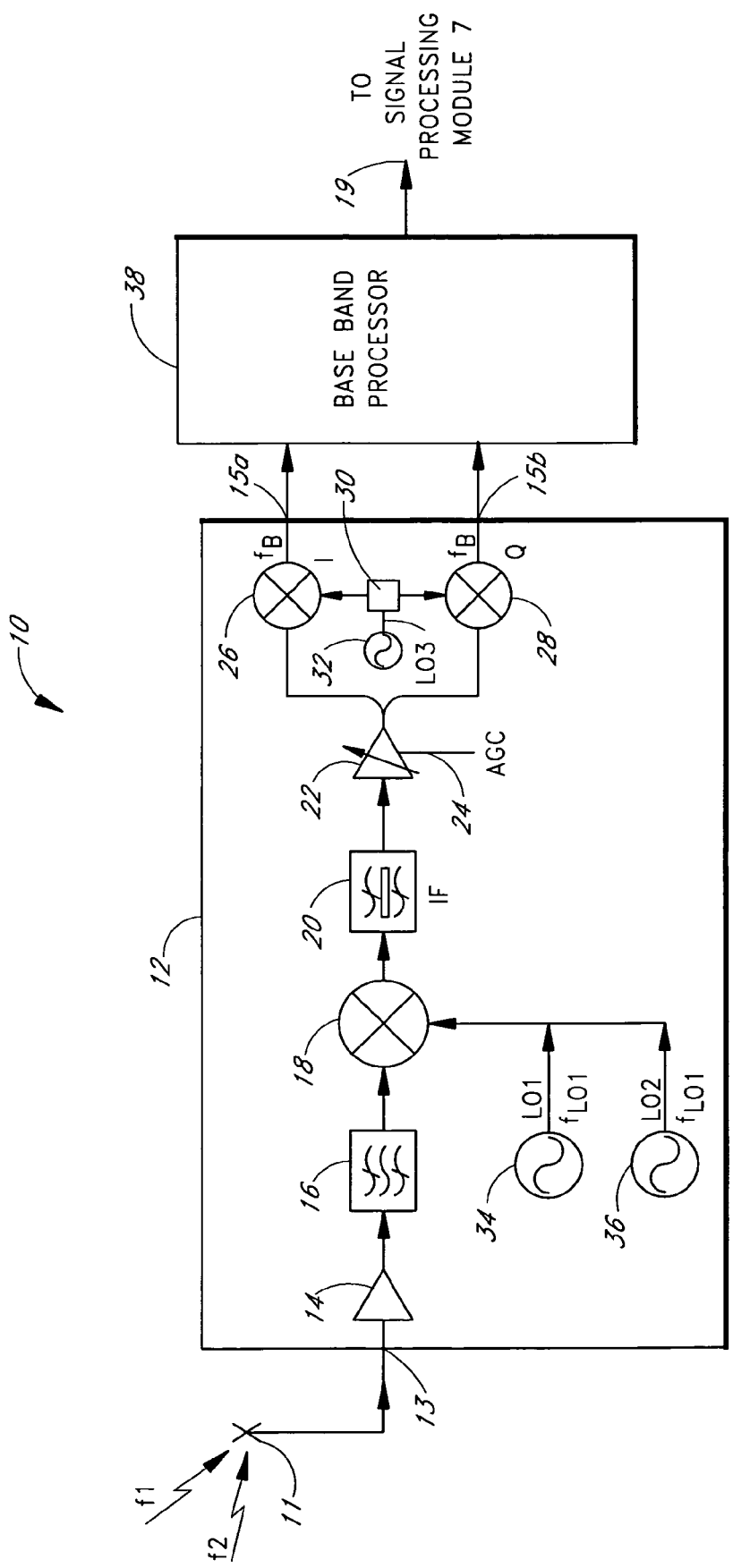
FIG. 5 is an illustration of a receiver included in the receive path shown in FIG. 4.

FIG. 5 shows a schematic illustration of the receiver 10. In one embodiment, the receiver 10 is implemented as an integrated circuit and configured to operate at a voltage between 2.7 volts and 5 volts. The voltage can be provided by a re-chargeable battery, or if the phone 3 is mounted to a car, from the car battery. However, those skilled in the art will appreciate that the receiver 10 can be configured to operated at lower or higher voltages. Further, it is contemplated that not all components of the receiver 10 are necessarily integrated in the integrated circuit. That is, a specific implementation of the receiver 10 may have discrete and isolated components in combination with integrated circuits.

The embodiment of the receiver 10 shown in FIG. 5 shows the receiver 10 in a single-ended embodiment. In another embodiment, the receiver 10 can be implemented in a differential embodiment. In some applications, the differential embodiment is preferred to differentiate the actual signal from noise and, thus, to improve the signal-to-noise ratio. If the receiver 10 is implemented in the differential embodiment, the components of the receiver 10 are connected between two differential lines which are typically referred to as "positive" and "negative", or "+" and "−." Compared to the single-ended embodiment, the components are duplicated for each differential line in the differential embodiment. The principal operation, however, corresponds to the operation of the single-ended embodiment.

Focusing on the single-ended implementation of the receiver 10, the receiver 10 includes a mixer module 12, which down converts the composite RF signal to the baseband, and a baseband processor 38. The mixer module 12 has an input 13 and outputs 15$a$, 15$b$ to connect the mixer module 12 to the antenna 11 and the baseband processor 38, respectively. The baseband processor 38 has an output 19, which is connectable to the signal processing module 7.

In one embodiment, the mixer module 12 comprises a combination of an amplifier 14 and a mixer 18 for signal amplification and frequency down conversion. The amplifier 14 is, for example, a low-noise amplifier (LNA) that receives the composite RF signal, amplifies the composite RF signal, and feeds the amplified RF signal to the mixer 18. In addition, the mixer 18 receives oscillator signals LO1, LO2 generated by two separate local oscillators 34, 36. The oscillator signals LO1, LO2 are, for example, sinusoidal signals each having a constant amplitude and frequency.

The mixer 18 multiplies the composite RF signal and the oscillator signals LO1, LO2, and the various signal components mix with each other. The oscillator signal LO1 mixes with the signals S1, S2 of the composite RF signal and the oscillator signal LO2 mixes with the signals S1, S2. As is known in the art, this mixing process results in a signal that includes a variety of different frequencies. These different frequencies include the original frequencies f1, f2, $f_{LO1}$, $f_{LO2}$, their harmonics, for example, 2f1, 2f2, 2$f_{LO1}$, 2$f_{LO2}$, and their sums and differences, for example, f1±$f_{LO1}$, f2±$f_{LO2}$.

In one embodiment, the difference frequencies −f1+$f_{LO1}$, −f2+$f_{LO2}$ are of interest. The oscillator frequencies $f_{LO1}$, $f_{LO2}$ are selected so that the difference frequencies −f1+$f_{LO1}$, −f2+$f_{LO2}$ fall within the same frequency band and have approximately the same value, i.e., (−f1+$f_{LO1}$)≈(−f2+$f_{LO2}$). This frequency value is hereinafter referred to as the "intermediate frequency," which is lower than the initial frequencies f1, f2, and written as "f1~$f_{LO1}$, f2~$f_{LO2}$." The local oscillators 34, 36 can be tuned to appropriate oscillator frequencies $f_{LO1}$, $f_{LO2}$ that fulfill the requirement of (f1~$f_{LO1}$)≈(f2~$f_{LO2}$). It is contemplated that this requirement generally indicates that the differences (f1~$f_{LO1}$; f2~$f_{LO2}$) fall within the same frequency band and that the differences (f1~$f_{LO1}$; f2~$f_{LO2}$) can be in the MHz range.

Because the mixer 18 generates an output signal that comprises a variety of different frequencies, a filter 20 is connected to the mixer 18 in order to block frequencies other than the intermediate frequency f1~$f_{LO1}$, f2~$f_{LO2}$. The signal output from the filter 20 is referred to as the intermediate frequency (IF) signal.

In the illustrated embodiment, the mixer module 12 further includes a filter 16, an amplifier 22, and two mixers 26, 28. The filter 16 is connected between the mixer 18 and the amplifier 14 connected to the input 13. The mixer 18 is connected to the filter 16 to receive the bandlimited composite RF signal and to the local oscillators 34, 36. As shown, the filter 16 is a bandpass filter which limits the bandwidth of the composite RF signal received from the amplifier 14 to block undesired frequency components and to reduce noise in the composite RF signal. The undesired frequency components can be caused, for example, by nonlinearities of the amplifier 14 that result in intermodulation products. In one embodiment, the passband of the filter 16 is about 25 MHz to allow passage of a receive band between about 850 MHz and 900 MHz, more precisely between 869 MHz and 894 MHz, and to block frequencies outside of this receive band.

The local oscillators 34, 36 are in one embodiment conventional local oscillators configured to operate at the different oscillator frequencies $f_{LO1}$, $f_{LO2}$. The oscillator signals LO1, LO2 can be sinusoidal signals each having a frequency between 500 MHz and 2.5 GHz. In one embodiment, the oscillator signal LO1 has a frequency $f_{LO1}$ of approximately 955 MHz and the oscillator signal LO2 has a frequency $f_{LO2}$ of approximately 960 MHz. These values for the frequencies $f_{LO1}$, $f_{LO2}$ correspond to radio frequencies of 875 MHz and 879 MHz, respectively.

Figure 6:
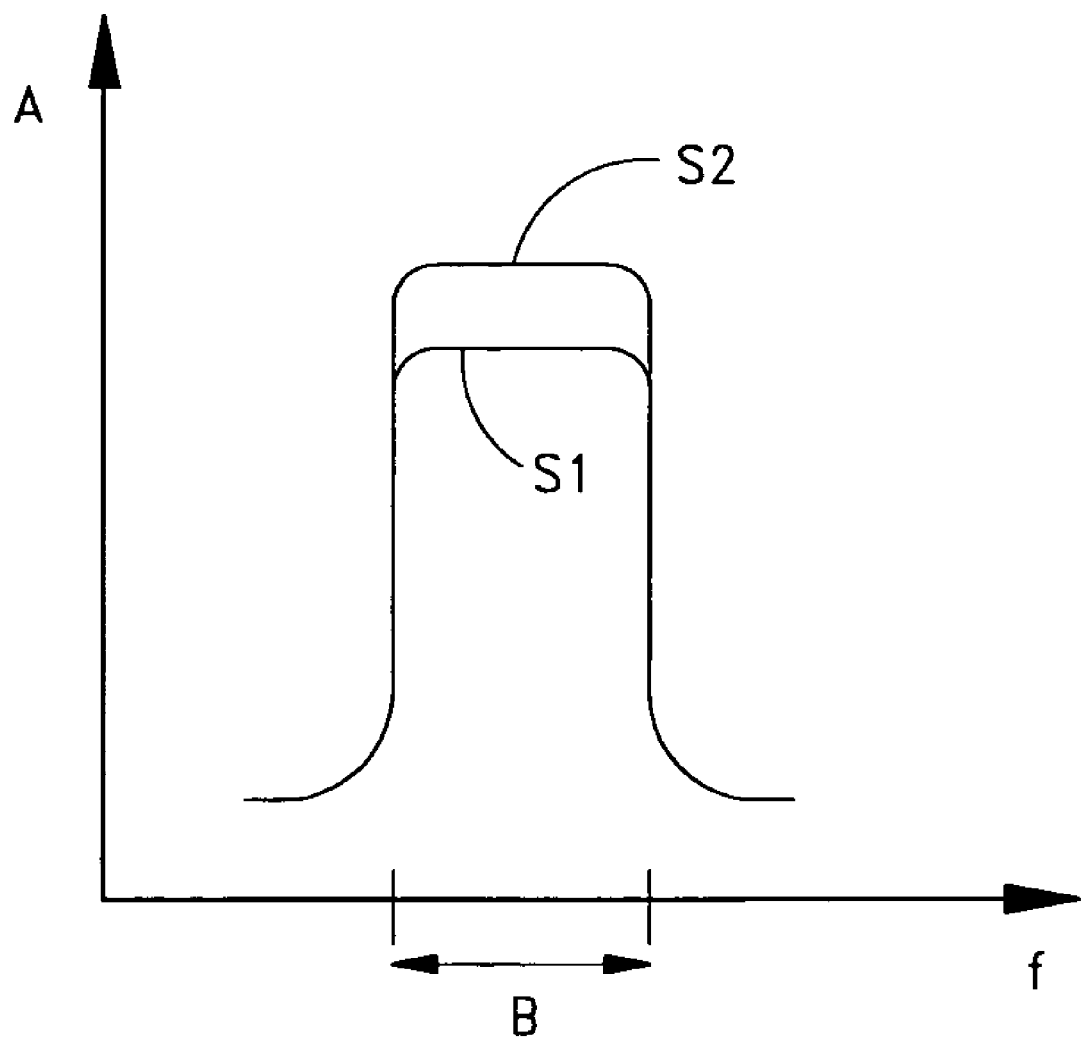
FIG. 6 is a spectrum of an intermediate frequency signal.

The oscillator signals LO1, LO2 are tunable to adapt to other phone systems which operate, for example, at carrier frequencies of about 1800 MHz or 1900 MHz. Alternatively, the phone 3 can be a dual band cellular phone which can operate within different frequency bands, for example, 800 MHz, 900 MHz, 1800 MHz, or 1900 MHz. Independent of what carrier frequencies the signals S1, S2 have, the frequencies of the signals LO1, LO2 are generally selected so that the difference (f1~$f_{LO1}$) is approximately in the same frequency band as the difference (f2~$f_{LO2}$). An exemplary signal output from the filter 20, in which the down converted signals S1, S2 fall within the same frequency band, is shown in FIG. 6 and described below.

Although FIG. 5 shows the local oscillators 34, 36 as belonging to the mixer module 12, it is contemplated that the local oscillators 34, 36 may be located outside the mixer module 12 and at other locations within the phone 3. If the mixer module 12 is implemented as an integrated circuit, the local oscillators 34, 36 are typically located off-chip. In one embodiment, the local oscillators 34, 36 are conventional frequency synthesizers whose frequencies are referenced to piezoelectric crystals. The synthesizers are tunable within a predetermined range. It is contemplated that other types of local oscillators, such as voltage controlled oscillators (VCO), can be used to generate the desired IF signal.

An output of the mixer 18 is connected to the filter 20, which is in the illustrated embodiment a bandpass filter. The filter 20 has a passband between approximately 1.25 MHz and approximately 85 MHz. In another embodiment, for example, in direct conversion receivers, the filter 20 is implemented as a low-pass filter, which has, for example, a cut-off frequency of approximately 0.63 MHz. The filter 20 selects the desired frequency band around the intermediate frequency $f1\sim f_{LO1}$, $f2\sim f_{LO2}$, and blocks frequencies, which are located outside the passband, or are higher than the cut-off frequency. It is contemplated that other values for the passband or the cut-off frequency can be chosen.

In one embodiment, the amplifier 22 is connected to a control line 24 to receive an automatic gain control signal AGC from a central controller (not shown) of the phone 3. The control signal AGC controls the amplifier 22 to amplify the IF signal with a desired gain. The amplifier 22 is operable at a gain between +45 dB and −45 dB to amplify the IF signal to a predetermined level over the entire dynamic range of the receiver In the illustrated embodiment, the mixers 26, 28 form a conversion module located within the mixer module 12, and connected to an output of the amplifier 22. Those skilled in the art, however, will appreciate that in another embodiment the mixers 26, 28 can be located within the baseband processor 38. An output of the mixer 26 is connected to the output 15*a* and an output of the mixer 28 is connected to the output 15*b*. A local oscillator 32 generates an oscillator signal LO3 that is, for example, a sinusoidal signal having an oscillator frequency $f_{LO3}$. The oscillator signal LO3 is input to the mixer 26 and, with a 90 degrees phase shift, to the mixer 28. That is, in one embodiment, the mixers 26, 28 receive signals having a sin function and a cosine function.

The oscillator frequency $f_{LO3}$ is selected so that the IF signal, having a frequency with $(f1\sim f_{LO1})\approx(f2\sim f_{LO2})$, is down converted to the baseband at a frequency $f_B$ of approximately 0–630 kHz. Similar to the first down conversion stage implemented through the mixer 18, the oscillator frequency $f_{LO3}$ is selected so that the IF signal is downconverted to baseband "In phase" (I) and "Quadrature" (Q) outputs. The second down conversion stage, implemented by the mixers 26, 28, splits the IF signal into the two components I, Q which correspond to I/Q components containing information transmitted by the base stations B1, B2. The components I, Q are input to the baseband processor 38 which performs the processing necessary to convert the received CDMA signal back to an uncoded ("de-spread") signal and extracts the voice/data signals.

As is known to the person skilled in the art, CDMA is a spread spectrum technique for multiple access. The CDMA technique is sometimes explained with reference to a situation encountered at a cocktail party. Like in a cellular CDMA system, all guests are talking in the same room simultaneously, but every conversation occurs in a different language. If one guest does not understand these languages, they would all sound like "noise" from the guest's perspective. However, if the guest would know the "code," i.e., the appropriate language, the guest could "filter out" the unknown languages (noise) and listen only to the conversation in the language the guest understands.

Besides the language (code) problem, the guest may encounter another problem. Even with knowledge of the appropriate language, the guest may not hear the complete conversation because either the speaker does not speak loud enough, or the other speakers speak too loud. The guest can signal to the speaker to speak louder, but can also signal to the other guests to speak more softly. The cellular CDMA system applies a corresponding "power control" process and filter function.

Referring to a cellular CDMA system, multiple telephone conversations are spread across a wide segment of a (broadcast) frequency spectrum at a transmitter and "de-spread" at the receiver. Each user (telephone call) is assigned a unique code to modulate transmitted data. The code is unique and distinguishes a specific call from the multitude of other calls simultaneously transmitted over the same broadcast spectrum. The code is a long sequence of ones and zeros similar to the output of a random number generator of a computer. The computer generates the code using a specific algorithm and the numbers appear to be random. Because the codes are nearly random, there is very little correlation between the different codes. In addition, there is very little correlation between a specific code and any time shift of that same code.

Thus, the distinct codes can be transmitted over the same time and the same frequencies and the signals can be decoded at the receiver by correlating the received signal which is the sum of all transmitted signals with each code. As the receiver has the correct code, it can decode the received signal, i.e., the receiver can select "its" conversation from all the others. With CDMA, all users on a 1.25 MHz-wide channel can share the same frequency spectrum because each user's conversation is differentiated utilizing CDMA's unique digital codes. That same 1.25 MHz of frequency spectrum is re-used in each cell in the network.

In one embodiment, the base station B1, B2, BS1, BS2 communicates with each phone every 1.25 milliseconds to control its power level. Every 1.25 milliseconds, the base station B1, B2, BS1, BS2 instructs the phone 3 to increase or decrease its power, depending upon its distance from the base station B1, B2, BS1, BS2. The CDMA phone 3 transmits only the minimum power required to maintain a communications link. If the phone 3 is too far away from the serving base station B1, and the phone's transmitted power can not be increased, or if a neighboring base station B2, BS1, BS2 provides for a better radio connection, the phone 3 is handed off to one of the neighboring cell/base stations B2, BS1, BS2.

The receiver 10 illustrated in FIG. 5 monitors the pilot channels received at the frequencies f1, f2. The pilot channels are down converted to the baseband as described above and the signal strength of the pilot channels is determined independently. The signal strengths of the pilot channels are compared to a threshold value. If the signal strength of the target cell's pilot channel is above the threshold value, the controller BC1 (FIG. 1) initiates the handoff procedure.

FIG. 6 is a graph illustrating an exemplary spectrum of the IF signal, wherein the amplitude of the IF signal is shown as a function of the frequency f. For example, a spectrum analyzer is connected to an output of the filter 20 to measure the spectrum. As the IF signal passed through the filter 20, the spectrum of the IF signal is band limited having a bandwidth B of approximately ±630 kHz.

As described above, the IF signal is a composite signal comprising the signals S1, S2 that originate from two different base stations, for example, the serving base station B1 and the target base station B2. In the illustrated embodiment, the amplitude of the signal S2 is higher than the amplitude of the signal S1. The signals S1, S2 can be separated through correlation with the respective codes as described above. When the signals S1, S2 are separated, the signal strengths in the pilot channels can be determined.

Figure 7:
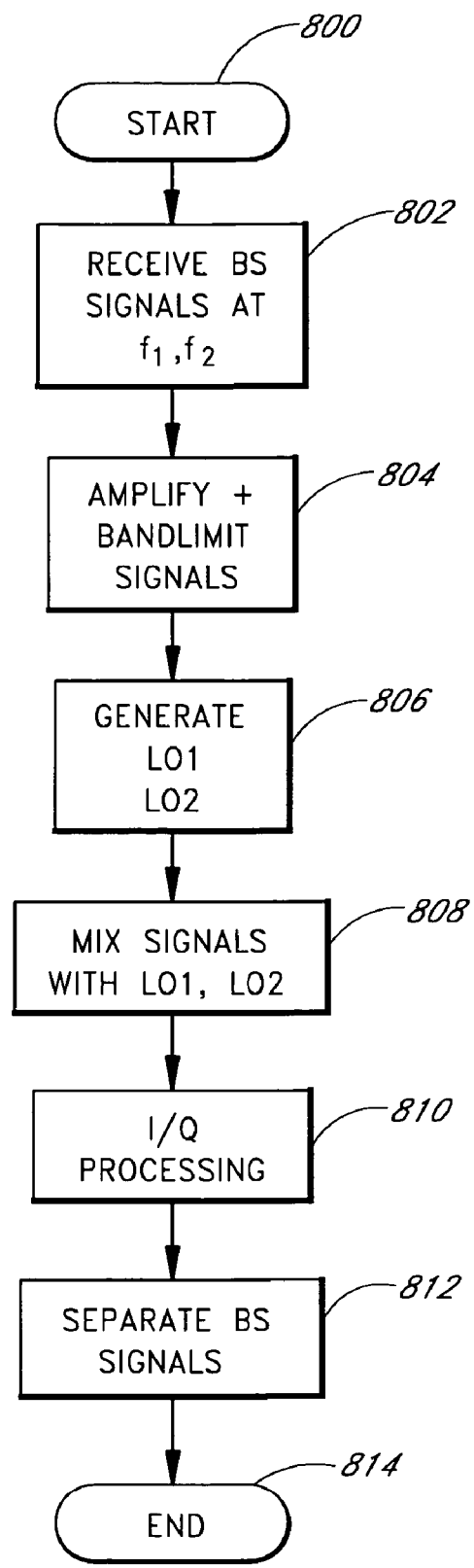
FIG. 7 is a flow chart illustrating a handoff procedure.

FIG. 7 is a flow chart illustrating the operation of the phone 3 when it receives RF signals originating from, for example, two different base stations B1, B2, BS1, BS2. Referring to FIG. 1, for the following description it is assumed the phone 3 moves from the serving cell C1 to the target cell C2. The procedure is initialized at state 800.

Proceeding to state 802, the receiver 10 receives the signals S1, S2 from the serving base station B1 of the cell C1, and the target base station B2 of the cell C2. The signal S1 has the frequency f1 and the signal S2 has the frequency f2. As discussed above, the frequency f1 can be equal to the frequency f2 or different from the frequency f2. The antenna 11 receives the signals S1, S2 simultaneously and, thus, converts the signals S1, S2 to the composite RF signal.

Proceeding to state 804, the amplifier 14 amplifies the relative weak composite RF signal to a level sufficient for further processing. As the amplifier 14 may cause undesired modulation products in addition to other potentially present noise components, the serially connected filter 16 serves to block these modulation products and noise components in order to minimize noise within the composite RF signal. In one embodiment, the filter 16 is a band pass filter that limits the bandwidth of the composite signal.

Proceeding to state 806, the mixer 18 receives the amplified and band limited composite RF signal. In one scenario, for example, while the phone 3 is in the very proximity of the base station B1 and thus has only a radio connection (signal S1) with the base station B1, the phone 3 operates the local oscillator 34 so that the oscillator signal LO1 mixes with the signal S1 to generate the IF signal having the desired intermediate frequency $f1 \sim f_{LO1}$. The oscillator 36 can be tuned to approximately the same frequency, i.e., $f_{LO1} \approx f_{LO2}$, so that the oscillator signal LO2 leads to the same IF signal, or the oscillator 36 scans across a predetermined frequency range which allows the phone 3 to detect if another signal is present.

In another scenario, the phone 3 started to move away from the base station B1 and closer to the base station B2. While the phone 3 processes the signal S1, for example, to decode the signal S1 and to detect if another signal is present, the phone 3 tunes the local oscillator 36 to the frequency $f_{LO2}$ so that the frequency difference $f1 \sim f_{LO1}$ is in the same frequency band as described above.

Proceeding to state 808, the phone 3 has moved closer to the base station B2 and the local oscillators 34, 36 are appropriately tuned to generate the oscillator signals LO1, LO2. The mixer 18 is part of the first down conversion stage, which converts the signals S1, S2 to the lower intermediate frequency. The mixer 18 mixes the composite RF signal, including the signals S1, S2, and the oscillator signals LO1, LO2 to generate an output signal that includes the desired IF signal with $(f1 \sim f_{LO1}) \approx (f2 \sim f_{LO2})$ as explained above.

Proceeding to state 810, the phone 3 processes the signal output from the first down conversion stage. The filter 20 separates the IF signal from the output signal in that it passes only the IF signal. The amplifier 22 amplifies the IF signal to compensate for losses that occurred through separating the IF signal from the output signal.

The processing further includes separating the IF signal in the second down conversion stage into the components I, Q. The IF signal is split. One part of the IF signal is multiplied with a sine signal and the other part of the IF signal is multiplied with a cosine signal. The sine signal and the cosine signal are derived from the oscillator signal LO3 having the oscillator frequency $f_{LO3}$. The second down conversion stage outputs the components I, Q which have the baseband frequency $f_B$.

Proceeding to state 812, the baseband processor 38 receives the components I, Q and applies the pseudo-noise codes. The application of the pseudo-noise codes results in two separate signals in the baseband. These signals are further processed in the subsequent signal processing module 7. The signal processing module 7, for example, extracts the traffic channel to convert the signal S2 into an analog speech signal, and analyzes the signal strength of the pilot channel. The procedure ends at state 814.

In the above embodiment, the frequencies f1, f2 are allocated within the same frequency band and the signals S1, S2 from the antenna 11 share a common receive path up to the mixer 18. Both signals S1, S2 pass through the filter 16. However, in another embodiment of the systems 1, 100, the frequencies f1, f2 can be in different frequency bands. In this case, the receive path of the mixer module 12 is modified, as shown in FIG. 8, because under these circumstances one of the signals S1, S2 could be blocked by the filter 16.

Figure 8:
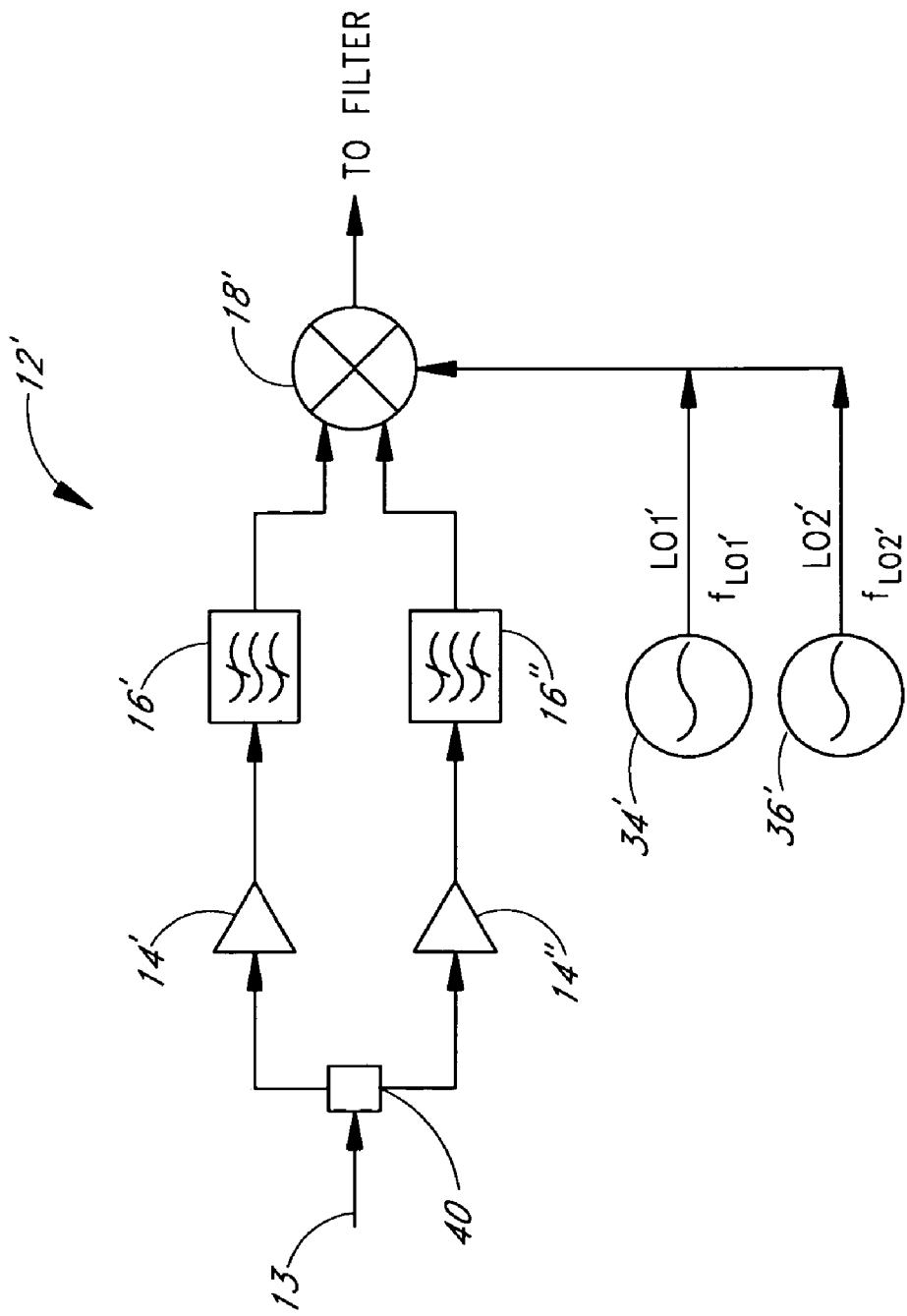
FIG. 8 is an illustration of an embodiment of a receiver mixer module.

FIG. 8 shows a section of a mixer module 12' which is a further embodiment of the mixer module 12. The illustrated section includes the receive path between the input 13 and the mixer 18'. The remaining section of the mixer module 12', i.e., between the mixer 18' and the outputs 15a, 15b, is as shown in FIG. 5.

The receive path between the mixer 18' and the input 13 includes a first path having a serial arrangement of an amplifier 14' and a low-pass filter 16', and a second path having a serial arrangement of an amplifier 14" and a filter 16". The filters 16', 16" are connected to the mixer 18', and the amplifiers 14', 14" are connected to a duplexer 40 which is further connected to the input 13 and, thus, to the antenna 11.

The amplifiers 14', 14", like the amplifier 14 shown in FIG. 5, amplify the composite RF signal that includes the signals S1, S2. As the filter 16 in FIG. 5, the filters 16', 16" can be bandpass filters or low pass filters, each filter 16', 16" passing only the desired signal frequency f1 or f2. For example, the filter 16' is configured to pass only the signal S1, and the filter 16" passes only the signal S2. In a cellular CDMA system, the filters 16' and 16" are tuned to pass signals in a frequency band between about 869 MHz and about 894 MHz. In a PCS/CDMA system, the filters 16' and 16" are tuned to pass signals in a frequency band between about 1930 MHz and about 1960 MHz The mixer 18' receives the signals S1, S2 and oscillator signals LO1', LO2' generated by the local oscillators 34', 36'. The oscillator signals LO1', LO2' have oscillator frequencies $f_{LO1'}$, $f_{LO2'}$, respectively. The oscillator signals LO1', LO2' and the signals S1, S2 mix as described above. The oscillator frequencies $f_{LO1'}$, $f_{LO2'}$ are selected so that the output signal from the mixer 18' has signal components with $f1 \sim f_{LO1'} \approx f2 \sim f_{LO2'}$.

Figure 9:
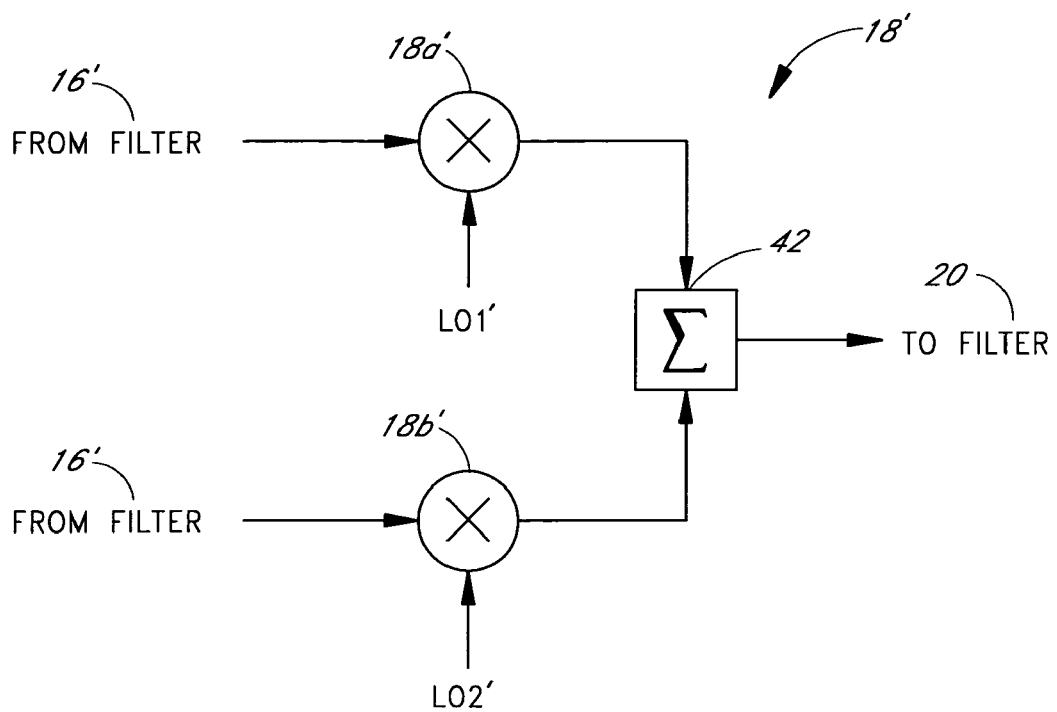
FIGS. 9 and 10 are illustrations of embodiments of mixers.

FIG. 9 shows an illustration of an embodiment of the mixer 18' shown in FIG. 8. The mixer 18' includes a mixer 18a' connected to the filter 16' and receiving the oscillator signal LO1', and a mixer 18b' connected to the filter 16" and receiving the oscillator signal LO2'. Each mixer 18a', 18b' is connected to a signal combiner 42 that combines the output signals (intermediate frequency signals) of the mixers 18a', 18b' to the IF signal input to the filter 20.

Figure 10:
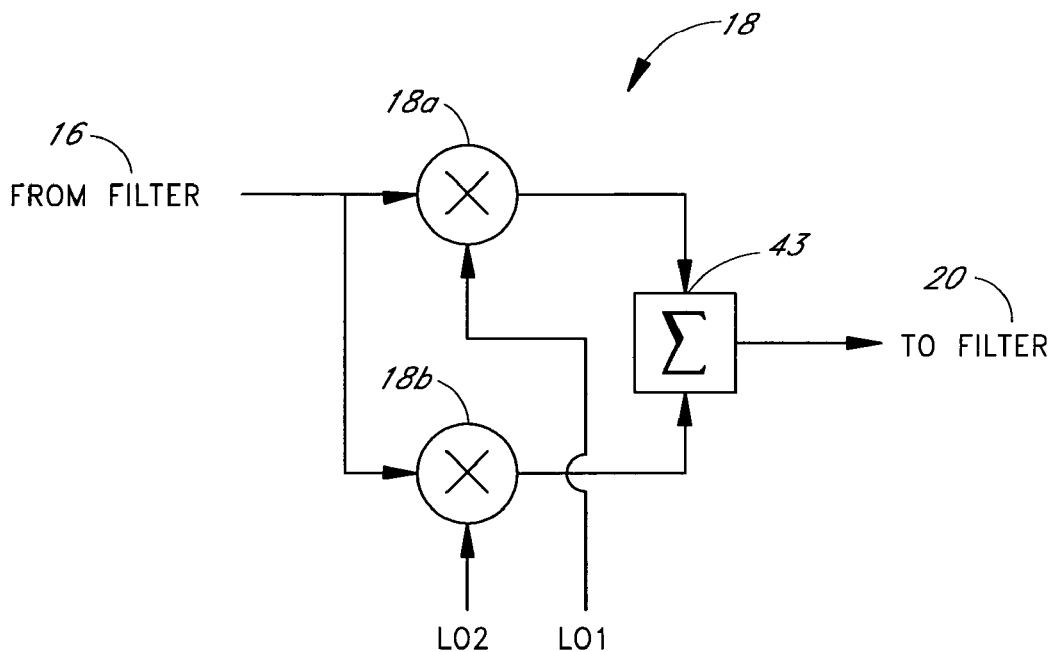

FIG. 10 shows an illustration of an embodiment of the mixer 18 shown in FIG. 5. The mixer 18 includes a mixer 18a connected to the filter 16 and receiving the oscillator signal LO1, and a mixer 18b connected to the filter 16 and receiving the oscillator signal LO2. Each mixer 18a, 18b is connected to a signal combiner 43 that combines the output signals (intermediate frequency signals) of the mixers 18a, 18b to the IF signal input to the filter 20.

The phone 3 allows a soft handoff between neighboring cells that operate at different carrier frequencies. The phone 3 has two local oscillators 34, 36 and at least one of them is tunable over a predetermined frequency range to cover the frequencies used in neighboring cells or even cells of a different system.

In one embodiment, the phone 3 moves exclusively within the system 1 which is a cellular CDMA system. When the phone 3 moves from one cell to another, the system 1 is configured to perform intra-system handoffs. In case the neighboring cells C1–C4 have the same assigned frequency (i.e., f1≈f2), the phone 3 operates like a conventional cellular phone. However, if the neighboring cells C1–C4 have different assigned frequencies (i.e., f1≠f2), in accordance with the present invention, the phone 3 still allows performance of the "Soft Handoff."

While the phone 3 has an active traffic connection with the base station B1, the phone continuously monitors the signal strength of the pilot channel of this traffic connection. During the traffic connection, the local oscillator 34 is tuned so that the difference frequency $f1 \sim f_{LO1}$ is the intermediate frequency. In addition, the phone 3 "listens" if it receives pilot channels from neighboring cells C2–C4. For that purpose, the phone 3 scans a predetermined frequency range by tuning the local oscillator 36 correspondingly. As soon as a (neighboring) pilot channel, for example, within the signal S2 at the frequency f2, is present and the oscillator frequency $f_{LO2}$ is set so that the difference $f1 \sim f_{LO1}$ falls within the same frequency band as the difference $f2 \sim f_{LO2}$, components of both signals S1, S2 fall within the band of the intermediate frequency defined by the filter 20. In this case, the phone 3 detects the presence of the neighboring pilot channel.

Once detected, the phone 3 continues to monitor the signal strength of the neighboring pilot channel. When the signal strength of the neighboring pilot channel exceeds the predetermined threshold, the system 1 initiates the hand off from the cell C1 to the cell C2. At the time this hand off occurs, the phone 3 is tuned to receive simultaneously the signals S1, S2. That is, when the previous connection (signal S1) is broken, the new connection (signal S2) already exists. Although the neighboring frequencies are different, the soft handoff and its advantages are maintained. The user of the phone 3 does not notice the hand off, because the new connection is made before the old connection is broken.

In another embodiment, the phone 3 moves between the systems 1, 100, for example, from the cell C1 to the cell C5, and the systems 1, 100 allow inter-system handoffs. Such an inter-system handoff could be necessary, for example, if the user of the phone 3 reaches a limit of the coverage area of the system 1 during a phone call, but continues to travel and to talk. Without an inter-system handoff, the phone call would be terminated, eventually without a warning, because the radio connection suddenly breaks.

The system 1 can be a conventional cellular CDMA system in which the neighboring cells C1–C4 operate at the same assigned frequency f1. The system 100 can be a conventional PCS system in which the neighboring cells C5, C6 operate at the same assigned frequency f3 which is different from the frequency f1.

While the phone 3 has an active traffic connection with the base station B1, the phone continuously monitors the signal strength of the pilot channel of this traffic connection. The phone 3 also monitors the signal strengths of neighboring pilot channels of the system 1, to determine when a handoff within the system 1 is necessary. During the traffic connection, the local oscillator 34 is tuned so that the difference frequency $f1 \sim f_{LO1}$ is the intermediate frequency.

In addition, the phone 3 "listens" if it receives pilot channels from neighboring cells C5 of the system 100. For that purpose, the phone 3 scans a predetermined frequency range defined by the system 100 by tuning the local oscillator 36 correspondingly. As soon as a (neighboring) pilot channel, for example, at the frequency f3, is present and the oscillator frequency $f_{LO3}$ is set so that the requirement $(f1 \sim f_{LO1}) \approx (f3 \sim f_{LO3})$ is fulfilled, components of both signals fall within the band of the intermediate frequency defined by the filter 20. In this case, the phone 3 detects the presence of the neighboring pilot channel. The subsequent procedure, including the soft handoff between the cell C1 (system 1) and the cell C5 (system 100) is as described above.

While the above detailed description has shown, described and identified several novel features of the invention as applied to different embodiments, it will be understood that various omissions, substitutions and changes in the form and details of the described embodiments may be made by those skilled in the art without departing from the spirit of the invention. Accordingly, the scope of the invention should not be limited to the foregoing discussion, but should be defined by the appended claims.

What is claimed is:

1. A wireless communications device for communications with a first base station at a first frequency and a second base station at a second frequency, the wireless communications device comprising:
    an antenna configured to receive a first signal at a first frequency and a second signal at a second frequency, said antenna configured to output the first and second signals as a first composite signal;
    a first oscillator operable to output a first oscillator signal at a first frequency;
    a second oscillator operable to output a second oscillator signal at a second frequency; and
    a mixer configured to receive the first composite signal, the first oscillator signal and the second oscillator signal, the mixer configured to generate a second composite signal with components of the first and second signals occupying at least a portion of a common frequency band.

2. The device of claim 1 further comprising a filter connected to an output of the mixer, the filter having a passband that corresponds to the common frequency band.

3. The device of claim 1 wherein the first and second oscillators are tunable within predetermined frequency ranges.

4. The device of claim 1 wherein the mixer is further configured to mix the first oscillator signal with the first signal so that components of the first signal occupy the common frequency band.

5. The device of claim 1 wherein the mixer is further configured to mix the second oscillator signal with the second signal so that components of the second signal occupy the common frequency band.

6. The device of claim 1 further comprising a conversion module connected to receive the second composite signal, the conversion module configured to convert the second composite signal to a baseband signal.

7. The device of claim 6 wherein the baseband signal comprises a first component and a second component.

8. The device of claim 6 further comprising a processor module in communication with the baseband signal, the processor module configured to process the baseband signal.

9. The device of claim 8 wherein the processor module is configured to correlate the baseband signal with a predetermined function to separate the first signal and the second signal.

10. The device of claim 1 wherein the first frequency is between about 800 MHz and about 900 MHz and the second frequency is between about 800 MHz and about 900 MHz.

11. The device of claim 1 wherein the first frequency is between about 800 MHz and about 900 MHz and the second frequency is between about 1800 MHz and about 1900 MHz.

12. The device of claim 1 wherein the first and second signals are adapted for a code division multiple access (CDMA) system.

13. The device of claim 1 wherein the first and second signals are adapted for a personal communications service (PCS) system.

14. The device of claim 1 wherein the first signal is adapted for a code division multiple access (CDMA) system and the second signal is adapted for a personal communications service (PCS) system.

15. The device of claim 2 wherein the filter has a passband between approximately 1.25 MHz and approximately 85 MHz.

16. The device of claim 1 wherein the second composite signal comprises a third frequency which is lower than the first frequency and the second frequency.

17. The device of claim 2 further comprising first and second parallel receive paths between the mixer and the antenna, each receive path including a serial arrangement of an amplifier and a filter and adapted to receive one of the first and second frequency signals located within different frequency bands.

18. The device of claim 17 wherein the filter of the first receive path blocks the second frequency signal, and the filter of the second receive path blocks the first frequency signal.

19. The device of claim 16 wherein the mixer mixes the first oscillator signal with the first frequency signal and the second oscillator signal with the second frequency signal to generate a signal at the third frequency.

20. The device of claim 1 wherein the mixer is a demodulator.

21. A method of receiving signals with a wireless communications device operable in a communications system comprising:
receiving a first signal having a first frequency within a first frequency band from a first source;
receiving a second signal having a second frequency signal within a second frequency band from a second source;
transforming the first and second signals into a third frequency band, the act of transforming comprising:
mixing the first signal with a first oscillator signal at a first oscillator frequency; and
mixing the second signal with a second oscillator signal at a second oscillator frequency, wherein the difference between the first frequency and the first oscillator frequency, and the difference between the second frequency and the second oscillator frequency fall within the third frequency band; and
processing said frequency-transformed first and second signals to maintain communications with the first and second sources.

22. The method of claim 21 wherein the first signal corresponds to a traffic connection and the second signal corresponds to a signaling connection.

23. The method of claim 22 wherein the act of processing includes determining if a signal strength of the signaling connection exceeds a predetermined threshold.

24. The method of claim 23 further comprising transferring the traffic connection from the first signal to the second signal when the signal strength exceeds the threshold, so that after said transfer the second signal corresponds to the traffic connection.

25. The method of claim 21 wherein the act of transforming includes converting the first and second signals to at least one lower frequency within the third frequency band.

26. The method of claim 21 wherein the act of transforming includes converting the first and second signals at the first and second frequencies to first and second lower frequencies within the third frequency band.

27. The method of claim 26 wherein the first lower frequency is approximately equal to the second lower frequency.

28. A method of receiving signals comprising:
receiving a first frequency signal having a first frequency and originating from a first transmitter station and a second frequency signal having a second frequency and originating from a second transmitter station;
converting the first and second frequency signals into a composite signal;
generating a first oscillator signal having a first oscillator frequency, the first oscillator frequency being selected to have a first frequency difference to the first frequency;
generating a second oscillator signal having a second oscillator frequency, the second oscillator frequency being selected to have a second frequency difference to the second frequency;
mixing the composite signal with the first and second oscillator signals to generate an intermediate frequency signal, the intermediate frequency signal comprising a component of the first frequency signal and a component of the second frequency signal with the components being located within a common frequency band; and
mixing the intermediate frequency signal with a third oscillator signal at a first phase to generate a first baseband signal and mixing the intermediate frequency signal with the third oscillator signal at a second phase to generate a second baseband signal, wherein the first baseband signal corresponds to the first signal and the second baseband signal corresponds to the second signal, and wherein the first phase and the second phase are approximately 90° apart.

29. The method of claim 28 wherein the first frequency is approximately equal to the second frequency, and wherein the first oscillator frequency is approximately equal to the second oscillator frequency.

30. The method of claim 28 wherein the first and second frequencies have different values, and wherein the first and second oscillator frequencies have different values.

31. The method of claim 30 wherein the intermediate frequency signal includes the components of the first and second frequency signals within a common frequency band.

32. The method of claim 28 further comprising applying decoding functions to the components of the first and second frequency signals to uncode the frequency signals.

33. The method of claim 28 wherein the first frequency difference and the second frequency difference are approximately equal.

34. The method of claim 28 wherein the first frequency difference and the second frequency difference fall within the common frequency band.

35. A method of receiving signals with a wireless communications device operable in a communications system comprising:
- receiving an input signal which comprises a first component allocated within a first frequency band and a second component allocated within a second frequency band;
- generating a first oscillator signal at a first oscillator frequency;
- generating a second oscillator signal at a second oscillator frequency;
- receiving the input signal, the first oscillator signal and the second oscillator signal;
- converting at least a portion of the first component and at least a portion of the second component to a third frequency band to produce an intermediate signal;
- generating a third oscillator signal comprising a sine signal and a cosine signal at a third oscillator frequency;
- mixing the intermediate signal with the sine signal and the cosine signal; and
- separating the intermediate signal into a first baseband component and a second baseband component.

36. The method of claim 35 further comprising applying pseudo-random noise codes to the first and second baseband components.

37. The method of claim 35 wherein the first oscillator frequency is different than the second oscillator frequency.

38. The method of claim 35 further comprising generating an output signal comprising output frequencies located within the third frequency band.

39. The method of claim 35 further comprising isolating the third frequency band.

40. The method of claim 35 wherein the third frequency band comprises a first difference component corresponding to a difference between the first component allocated within the first frequency band and the first oscillator signal at the first oscillator frequency.

41. The method of claim 40 wherein the third frequency band comprises a second difference component corresponding to a difference between the second component allocated within the second frequency band and the second oscillator signal at the second oscillator frequency.

42. The method of claim 41 wherein the first difference component is approximately equal to the second difference component.

43. A wireless communications device comprising:
- means for receiving an input signal which comprises a first component allocated within a first frequency band and a second component allocated within a second frequency band;
- means for generating a first oscillator signal at a first oscillator frequency;
- means for generating a second oscillator signal at a second oscillator frequency;
- means for receiving the input signal, the first oscillator signal and the second oscillator signal;
- means for converting at least a portion of the first component and at least a portion of the second component to a third frequency band;
- means for generating a third oscillator signal at a third oscillator frequency; and
- means for converting the at least a portion of the first component in the third frequency band and the at least a portion of the second component in the third frequency band to a baseband frequency.

* * * * *